(12) United States Patent
Myers

(10) Patent No.: US 10,731,723 B2
(45) Date of Patent: Aug. 4, 2020

(54) PNEUMATIC ACTUATOR ASSEMBLIES AS WELL AS CONVEYOR ASSEMBLIES AND CONVEYING SYSTEMS INCLUDING SAME

(71) Applicant: Firestone Industrial Products Company, LLC, Nashville, TN (US)

(72) Inventor: J. Richard Myers, Carmel, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 195 days.

(21) Appl. No.: 15/857,388

(22) Filed: Dec. 28, 2017

(65) Prior Publication Data

US 2018/0187736 A1    Jul. 5, 2018

Related U.S. Application Data

(60) Provisional application No. 62/440,235, filed on Dec. 29, 2016.

(51) Int. Cl.
| | | |
|---|---|---|
| *F16F 9/04* | (2006.01) | |
| *B60G 11/28* | (2006.01) | |
| *B29D 22/02* | (2006.01) | |
| *F01B 19/00* | (2006.01) | |
| *B65G 47/244* | (2006.01) | |

(52) U.S. Cl.
CPC .......... *F16F 9/0454* (2013.01); *B29D 22/023* (2013.01); *B60G 11/28* (2013.01); *B65G 47/244* (2013.01); *F01B 19/00* (2013.01); *B60G 2202/152* (2013.01); *B60G 2206/4222* (2013.01)

(58) Field of Classification Search
CPC ..... B29D 22/023; B65G 47/244; F01B 19/00; F16F 9/0454; B60G 11/28; F15B 15/103; F15B 15/10
See application file for complete search history.

(56) References Cited

U.S. PATENT DOCUMENTS

| | | | |
|---|---|---|---|
| 6,513,418 B1 * | 2/2003 | Simmons .............. | F15B 15/103 |
| | | | 254/93 HP |
| 6,612,223 B2 * | 9/2003 | Leonard .................... | B66F 3/35 |
| | | | 254/93 HP |
| 10,190,606 B2 * | 1/2019 | Leonard .................. | F15B 15/10 |
| 2013/0192455 A1 * | 8/2013 | Leonard .................... | B66F 3/35 |
| | | | 92/90 |

* cited by examiner

*Primary Examiner* — Abiy Teka
(74) *Attorney, Agent, or Firm* — Brian D. McAlhaney; Matthew P. Dugan

(57) ABSTRACT

Pneumatic actuator assemblies include a mounting base with a mounting base wall having a base surface portion a bearing support surface portion facing generally opposite the base surface portion. A flex member has a flex member wall that includes an engagement wall portion. The flex member is secured to the mounting base such that an actuator chamber is at least partially defined therebetween. A bearing element that has a bearing element surface is supported on the mounting base. The pneumatic actuator is displaceable between a first condition in which an exposed portion of the bearing element surface is spaced farther from the base surface portion than the engagement wall portion and a second condition in which the engagement wall portion is spaced a farther from the base surface portion than the exposed portion of the bearing element surface. Conveying systems and methods of assembly are also included.

20 Claims, 6 Drawing Sheets

PNEUMATIC ACTUATOR ASSEMBLIES AS WELL AS CONVEYOR ASSEMBLIES AND CONVEYING SYSTEMS INCLUDING SAME

This application claims the benefit of priority from U.S. Provisional Patent Application No. 62/440,235, filed on Dec. 29, 2016, the subject matter of which is hereby incorporated herein by reference in its entirety.

BACKGROUND

The subject matter of the present disclosure broadly relates to the art of actuating devices and, more particularly, to pneumatic actuator assemblies that include at least one flexible actuation member secured to a mounting base as well as at least one rolling element supported on the mounting base. Conveying systems including one or more of such pneumatic actuator assemblies are also included.

The subject matter of the present disclosure may find particular application and use in conjunction with components for material handling systems, such as conveying systems for transporting packages and/or other materials and objects, and will be shown and described herein with reference thereto. However, it is to be appreciated that the subject matter of the present disclosure is also amenable to use in other applications and environments, and that the specific uses shown and described herein are merely exemplary.

Conveying systems of a variety of type, kinds and constructions have been developed that are well known and commonly used for a wide variety of purposes and in a broad range of operating environments. In mining, power generation and heavy industrial applications, conveying systems can be used to transport mined materials (e.g., coal) over great distanced, such as from a mining site or stockpile to a distribution or usage site, for example. In packaging and material handling applications, conveying systems can be used to transport, arrange and sort packages and other objects, such as for distribution, bulk packaging (e.g., palletization) and/or loading on transport vehicles, for example.

As industries seek increased productivity, demands for improved performance of conveying systems that handle packages and/or other materials and objects have likewise increased. In many cases, the design and/or construction of systems and components of conveying systems will have both positive and negative influences on performance characteristics of such conveying systems, and achieving a desired balance of such influences remains an ongoing challenge. For example, a system or component having a substantial size and mass may provide increased performance in the form of strength, rigidity and/or robustness. In cases in which such a system or component undergoes displacement, however, a decrease in performance (e.g., speed of actuation or other operation) and/or increased energy consumption (e.g., consumption of pressurized gas) can result. As such, reducing the weight associated with one or more components and/or assemblies of conveying systems while maintaining (or improving) other characteristics such as strength, rigidity and robustness may contribute to a desired increase in performance of conveying systems. It is believed that advancing the art of pneumatic actuator assemblies, such as may be used in material handling systems, can aid in meeting the foregoing competing and/or other goals while providing comparable or improved performance.

Examples of some known pneumatic actuators are shown and described in: U.S. Pat. No. 6,513,418 to Simmons et al., which describes a pneumatic actuator that includes a hollow body and a fluid connector; U.S. Pat. No. 6,612,223 to Leonard et al., which describes a pneumatic actuator that includes a rigid base and a flexible top member secured together with a welded joint; and, U.S. Pat. Nos. 7,270,317 and 7,543,804 to Leonard, which describe pneumatic actuators with flexible walls, connector fittings in the flexible wall and a groove formed along the flexible wall adjacent the connector fitting.

Notwithstanding the overall success of known constructions, it is believed that a need exists to meet these competing and/or other goals while still retaining comparable or improved performance and/or otherwise advancing the art of pneumatic actuator assemblies and/or material handling systems including one or more of the same.

SUMMARY OF THE INVENTION

One example of a pneumatic actuator assembly in accordance with the subject matter of the present disclosure can be dimensioned for securement to an associated structural component and operable to support an associated object in spaced relation to the associated structural component. The pneumatic actuator assembly can include a mounting base having a first side and a second side opposite the first side. The mounting base can include a mounting base wall with a base surface portion disposed along the first side and a bearing support surface portion disposed along the second side and facing generally opposite the base surface portion. A flex member can include a flex member wall at least partially formed from a flexible polymeric material. The flex member wall can include an engagement wall portion and can be operatively secured to the mounting base such that an actuator chamber is at least partially defined therebetween. A bearing element can include a bearing element surface and can be operatively supported on the mounting base such that a first portion of the bearing element surface is disposed in facing relation to the bearing support surface portion and a second portion of the bearing element surface disposed outwardly of the mounting base a bearing surface distance from the base surface portion. The pneumatic actuator assembly can be operably displaceable between a first operative condition and a second operative condition. In the first operative condition, the engagement wall portion of the flexible wall can be disposed a first engagement distance from the base surface portion that is less than the bearing surface distance such that the second portion of the bearing element surface is exposed to abuttingly engage an associated object. In the second operative condition, the engagement wall portion can be displaced a second engagement distance from the base surface portion that is greater than the bearing surface distance such that the engagement wall portion is disposed beyond the second portion of the bearing element surface to abuttingly engage an associated object.

One example of a conveying system in accordance with the subject matter of the present disclosure can include a frame structure extending heightwise between a first frame side and a second frame side with a support surface disposed along the first frame side. A pneumatic actuator assembly can be disposed along the support surface of the frame structure. The pneumatic actuator assembly can include a mounting base that can include a mounting base wall with a base surface portion disposed along the support surface of the frame structure and a bearing support surface portion facing generally away from the support surface of the frame structure. The pneumatic actuator assembly can also include a flex member having a flex member wall that is at least partially formed from a flexible polymeric material. The flex member wall can include an engagement wall portion and can be operatively secured to the mounting base such that an actuator chamber is at least partially defined therebetween. The pneumatic actuator assembly can further include a bearing element that can include a bearing element surface. The bearing element can be supported on the mounting base such that a first portion of the bearing element surface is disposed in facing relation to the bearing support surface portion and a second portion of the bearing element surface disposed outwardly of the mounting base. The pneumatic actuator assembly can be displaceable between a first condition in which the second portion of the bearing element surface is spaced a greater distance from the support surface of the frame structure than the engagement wall portion of the flexible wall and a second condition in which the engagement wall portion is spaced a greater distance from the support surface than the second portion of the bearing element surface.

One example of a method of assembling a pneumatic actuator in accordance with the subject matter of the present disclosure can include providing a mounting base that has a first side and a second side opposite the first side. The mounting base can include a mounting base wall with a base surface portion disposed along the first side and a bearing support surface portion disposed along the second side and facing generally opposite the base surface portion. The method can also include providing a flex member that includes a flex member wall at least partially formed from a flexible polymeric material. The flex member wall can include an engagement wall portion. The method can further include securing the flex member to the mounting base such that an actuator chamber is at least partially defined therebetween. The method can also include providing a bearing element that includes a bearing element surface. The method can further include supporting the bearing element on the mounting base such that a first portion of the bearing element surface is disposed in facing relation to the bearing support surface portion and a second portion of the bearing element surface disposed outwardly of the mounting base. In this manner, the pneumatic actuator can be displaceable between a first condition in which the second portion of the bearing element surface is spaced a greater distance from the base surface portion than the engagement wall portion and a second condition in which the engagement wall portion is spaced a greater distance from the base surface portion than the second portion of the bearing element surface.

DETAILED DESCRIPTION

Turning, now, to the drawings, it is to be understood that the showings are for purposes of illustrating examples of the subject matter of the present disclosure and that the drawings are not to be interpreted as limiting. Additionally, it will be appreciated that the drawings are not to scale and that portions of certain features and/or elements may be exaggerated for purposes of clarity and/or ease of understanding.

FIGS. 1-4 illustrate one example of a pneumatic actuator assembly 100 in accordance with the subject matter of the present disclosure. As shown therein, pneumatic actuator assembly 100 can have a longitudinally-extending axis AX and can include a mounting base 102 and a flex member (or flexible actuator member) 104 that are operatively connected with one another such that a substantially fluid-tight seal is formed therebetween. Additionally, a bearing element 106 can be operatively disposed along mounting base 102. Actuator assembly 100 is shown supported on an associated support structure SST and is shown supporting an associated work piece WPC. It will be appreciated that a pneumatic actuator assembly in accordance with the subject matter of the present disclosure, such as actuator assembly 100, for example, can be used in a wide variety of applications and environments. As such, the associated support structure and the associated work piece are merely representative of opposing elements, components and/or structures that the actuator assembly can act on, against and/or otherwise between. Examples of such elements, components and/or structures can include, without limitation, an article (e.g., parcels and packages) and a structure (e.g., conveying systems) on which the article is supported, opposing machine components, opposing building structures, and/or opposing vehicle components.

Additionally, it will be appreciated that a pneumatic actuator assembly in accordance with the subject matter of the present disclosure can displace or moveably support either or both of the opposing elements, components and/or structures (e.g., associated support structure SST and associated work piece WPC) in any suitable manner. For example, one of the opposing components can be stationary or otherwise fixed and the other of the opposing components can be moveable relative to the stationary component. In such case, an actuator assembly in accordance with the subject matter of the present disclosure, such as pneumatic actuator assembly 100, for example, could be deemed to be supported in a fixed position on the stationary structure and selectively operated to displace or otherwise moveably support the moveable component or element (e.g., packages and parcels). Alternately, both of the opposing structures or components could be capable of movement. As such, it is to be understood that the usage arrangement shown and described herein is merely exemplary and that any other usage configuration and/or operation could alternately be employed.

Figure 1:
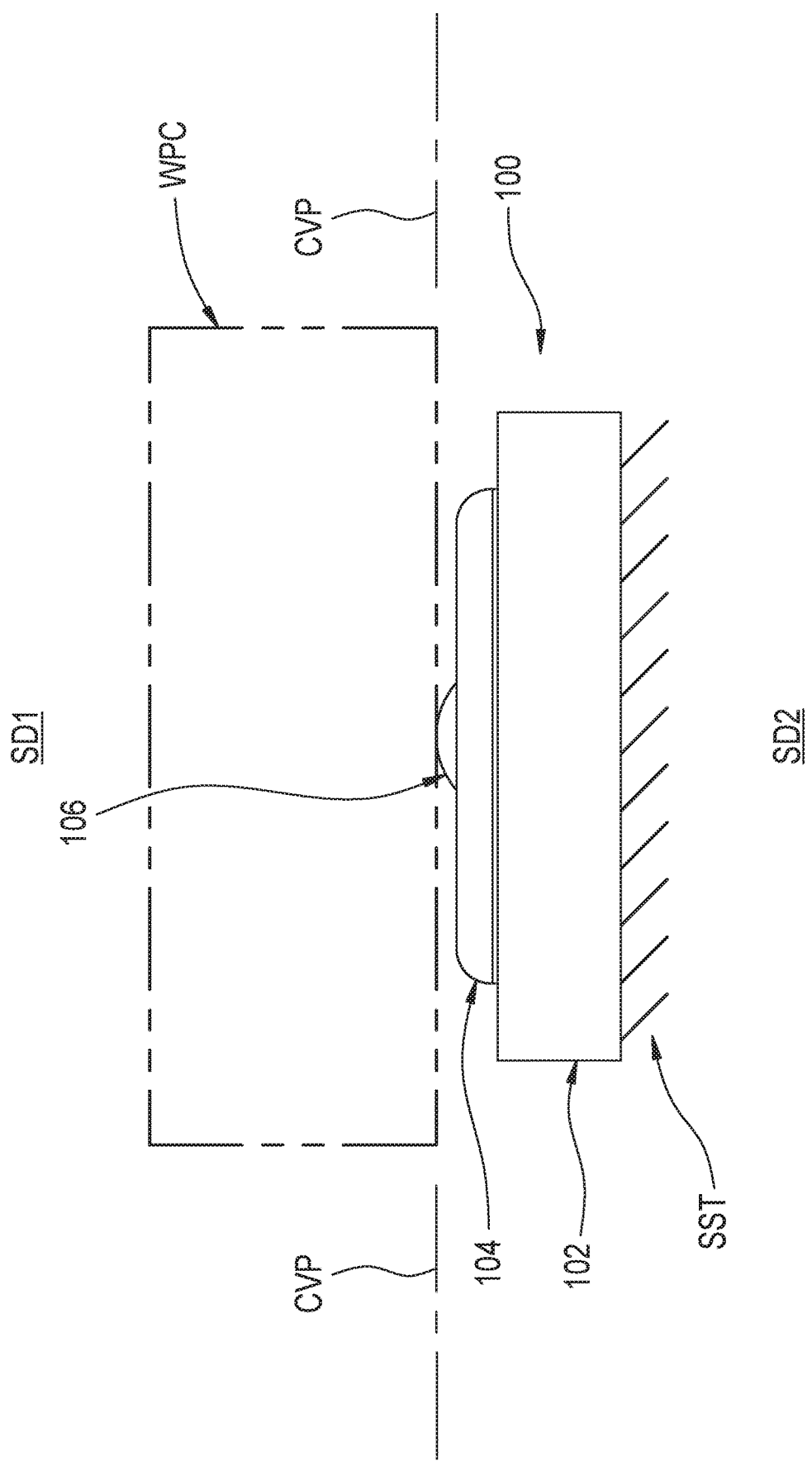
FIG. 1 is a side elevation view of one example of a pneumatic actuator assembly in accordance with the subject matter of the present disclosure.
Figure 2:
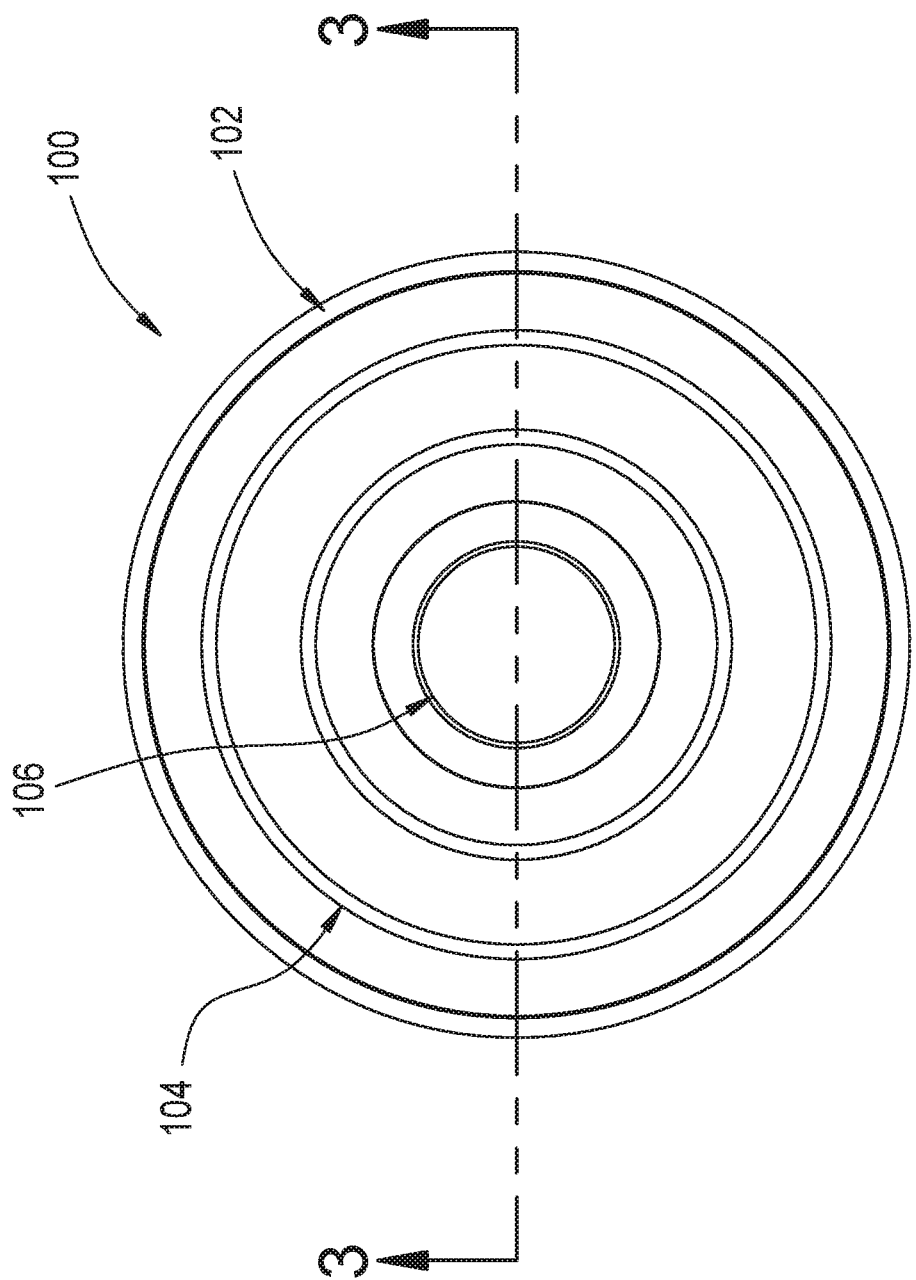
FIG. 2 is a top plan view of the exemplary pneumatic actuator assembly shown in FIG. 1.
Figure 3:
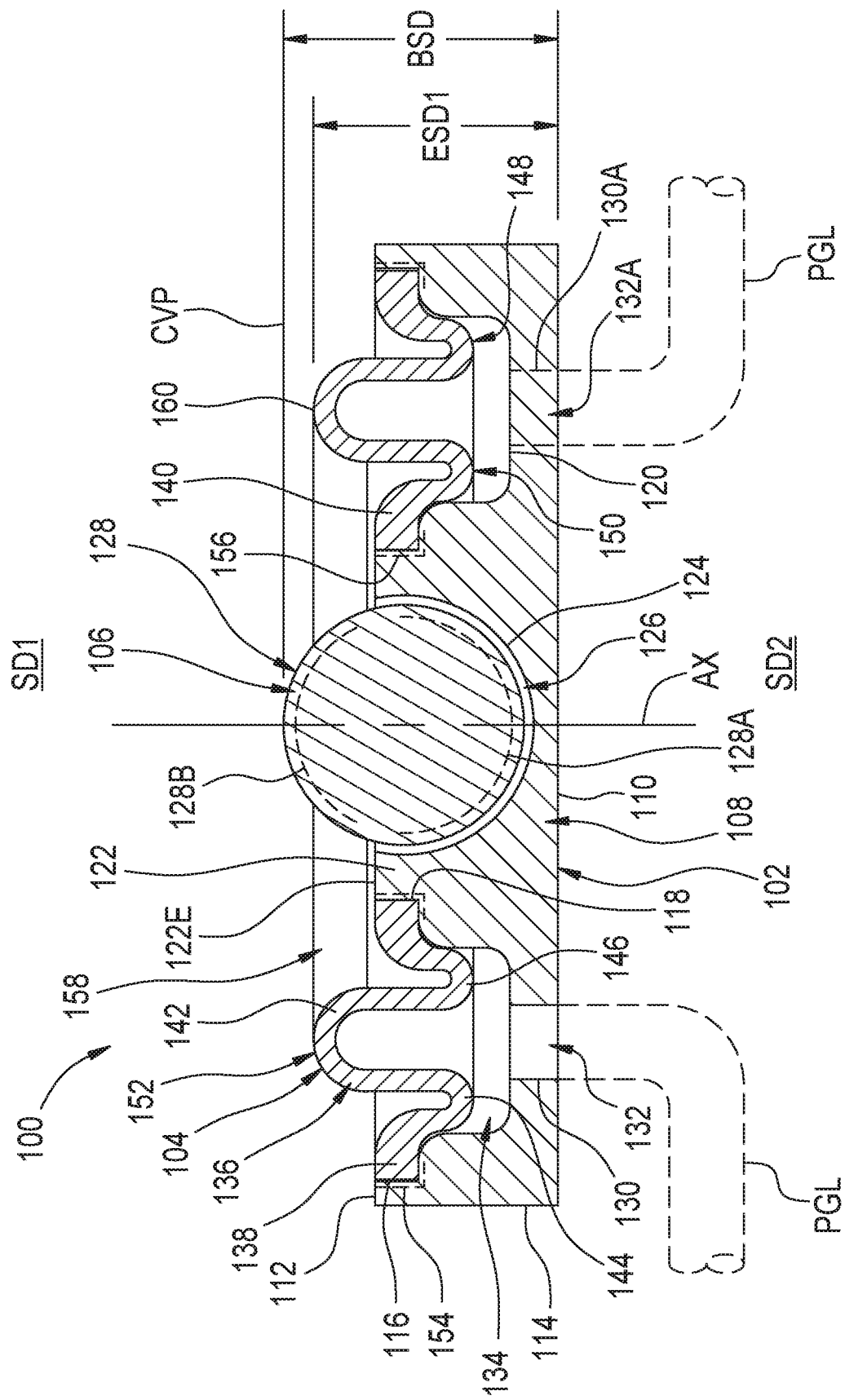
FIG. 3 is a cross-sectional side view of the exemplary pneumatic actuator assembly in FIGS. 1 and 2 taken from along line 3-3 in FIG. 2 with the actuator shown in a retracted condition.
Figure 4:
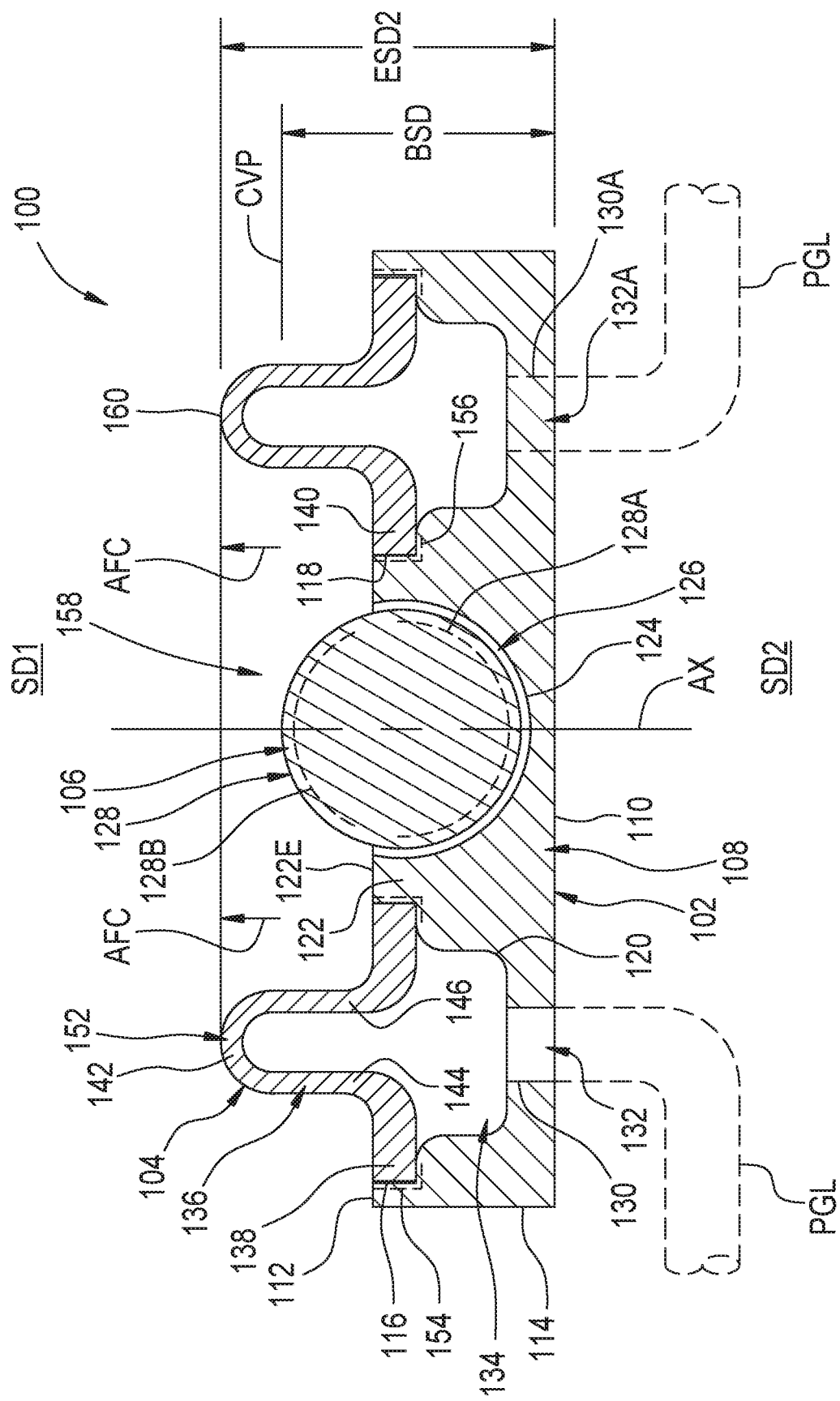
FIG. 4 is the cross-sectional side view of the exemplary pneumatic actuator assembly in FIG. 3 shown in an actuated condition.

One example of an anticipated usage arrangement is shown in FIG. 1 in which associated support structure SST is substantially fixed and actuator assembly 100 is supported on the associated support structure. In some cases, actuator assembly 100 may be freely supported on a supporting element, component and/or structure. In other cases, however, the actuator may be secured to the supporting element, component and/or structure in a suitable manner, such as by one or more fasteners and/or other securement devices, for example. Further to the above-described example of an anticipated usage arrangement, pneumatic actuator assembly 100 can be fluidically connected to an associated pressurized gas source in any suitable manner, such as, for example, by way of a pressurized gas line that is operatively connected to an internal chamber of the actuator assembly. By selectively transferring pressurized gas into and out of the internal chamber, the actuator can be displaced between a collapsed condition, which is shown in FIGS. 1-3, and an extended condition in which the actuator assembly is at least partially inflated, such as is shown in FIG. 4, for example. In such case, the actuator assembly can generate and apply an associated force capable of selectively positioning or otherwise displacing associated work piece WPC relative to associated support structure SST, such as is represented in FIG. 4 by arrows AFC, for example.

Mounting base 102 can have opposing sides SD1 and SD2, and can include a mounting base wall 108 that can be at least partially formed from any suitable material or combination of materials, such as one or more metal materials (e.g., steel, aluminum) and/or polymeric materials (e.g., polyamide, polyethylene, polypropylene, polyurethane), for example. Base wall 108 can include a mounting or base surface portion 110 facing toward side SD2 and oriented transverse to axis AX. Base surface portion 110 can be dimensioned to abuttingly engage associated support structure SST. Base wall 108 can also include a surface portion 112 facing toward side SD1 and generally opposite mounting surface portion 110. An outer surface portion 114 can extend between and operatively connect surface portions 110 and 112, and can, in some cases, at least partially define an outermost periphery of at least mounting base 102. Base wall 108 can further include attachment surface portions 116 and 118 that are disposed in radially-spaced relation to one another with a chamber surface portion 120 disposed therebetween.

Additionally, base wall 108 can include a wall portion 122 with an end surface portion 122E disposed in facing relation to side SD1. Wall portion 122 can include a bearing surface portion 124 that at least partially defines a bearing chamber 126 dimensioned to receive and retain at least a portion of bearing element 106. In some cases, a plurality of bearing elements could be operatively supported on or along the mounting base. Bearing element 106 can include a bearing element surface 128 operative to abuttingly engage parcels and/or other products, which are collectively represented by associated work piece WPC, during at least one condition of use of actuator assembly 100. It will be appreciated that bearing element 106 can be of any suitable type and/or kind, such as ball bearings (e.g., spherical) and/or roller bearings (e.g., cylindrical), for example. It will be appreciated that bearing surface portion 124 and bearing chamber 126 can have a complimentary shape and/or configuration to outer bearing surface 128. End surface portion 122E can be spaced relative to bearing surface portion 124 such that bearing chamber 126 has bearing chamber depth (not numbered) within wall portion 122. In some cases, the bearing chamber depth can be less than a cross-sectional dimension (e.g., diameter) of bearing element 106, such as being at least approximately hemispherical or at least approximately hemicylindrical, for example.

In an assembled condition, a portion 128A (dashed line) of bearing element surface 128 is disposed within bearing chamber 126 in facing relation to bearing surface portion 124. Another portion 128B (dashed line) of bearing element surface 128 is disposed outward of mounting base 102 and, as such, can be operative to act as a bearing element, such as to support associated work piece WPC under at least some conditions of use of pneumatic actuator assembly 100. It will be appreciated that portion 128B of bearing element surface 128 can at least partially define a reference surface or plane CVP of an associated conveying system on or along which the associated work piece can be supported or moved, and that portion 128B can at least partially define conveying surface or plane CVP in reference to any suitable feature or element. As one example, portion 128B can have a distal extent disposed a distance from base surface portion 110, as is represented in FIG. 3 by bearing surface distance dimension BSD.

Base wall 108 can also include a passage surface 130 that can at least partially define a passage 132 extending at least partially through base wall 108 and in fluid communication with at least chamber surface portion 120. In some cases, base wall 108 can, optionally, include one or more addition passage surfaces 130A that can at least partially define corresponding passages 132A, such as may be used to provide for fluid communication between two or more pneumatic actuator assemblies by way of pressurized gas lines PGL, for example. Mounting base 102 and flex member 104 can be operatively connected to one another such that a substantially fluid-tight seal is formed therebetween. Additionally, the mounting base and flex member can at least partially define an actuator chamber 134 within actuator assembly 100 that pressurized gas (e.g., pressurized air) can be selectively transferred into and out of, such as by way of passage 132, for example. In this manner, pneumatic actuator assembly 100 can be displaced between the collapsed and extended conditions, such as are illustrated in and described in connection with FIGS. 1-4.

Flex member 104 can include a flexible wall 136 that is preferably formed from a polymeric material that is comparatively flexible relative to the material from which mounting base 102 is formed. Flexible wall 136 can include a wall portion 138 and a wall portion 140 disposed in radially-spaced relation to one another. In some cases, wall portions 138 and 140 can be at least approximately positioned within a common plane that is oriented transverse to axis AX. As shown in FIGS. 3 and 4, wall portion 138 can be disposed adjacent attachment surface portion 116 and mounting wall portion 140 can be disposed adjacent attachment surface portion 118 with a wall portion 142 operatively disposed therebetween. Flexible wall portion 142 can include one or more pleats, convolutions or other features that permit the flexible wall portion to be displaced in an axial direction away from mounting base 102 as actuator assembly 100 is at least partially inflated, such as is illustrated in FIG. 4, for example.

As identified in FIG. 3, for example, flexible wall portion 142 can include a plurality of sections, such as, for example, wall sections 144 and 146 that are disposed in spaced relation to one another and, respectively, at least partially define annular convolutions 148 and 150 with an inverted, annular convolution 152 disposed therebetween. It will be appreciated, however, that other configurations and/or arrangements could alternately be used. Additionally, it will be appreciated that mounting base 102 and flex member 104 can be operatively secured to one another such that a substantially fluid-tight seal is formed therebetween in any suitable manner and by way of any suitable connection and/or joint, such as is represented in FIG. 3 by a flowed-material joint (dashed lines) 154 and 156, for example.

In one exemplary arrangement, such as is shown in FIGS. 1-4, for example, flex member 104 can extend peripherally about axis AX to at least partially form an endless, annular ring. Additionally, it will be appreciated that one or more portions (e.g., wall portion 140) of flexible wall 136 can at least partially form an opening 158 through which bearing element 106 can be accessible to support associated work piece WPC during one or more conditions of use of pneumatic actuator assembly 100. For example, FIGS. 1 and 3 illustrate pneumatic actuator assembly 100 in one condition of use, such as one in which the distal end and portion 138B of bearing element surface 138 are exposed or otherwise accessible to support or otherwise abuttingly engage associated work piece WPC. In such a condition of use, an engagement surface portion 160 of flexible wall portion 142 is disposed in offset relation to plane CVP that is at least partially formed by the distal end and/or portion 138B of bearing element surface 138. In the arrangement shown in at least FIGS. 1 and 3, engagement surface portion 160 is disposed at a distance from base surface portion 110, as is represented in FIG. 3 by engagement surface distance dimension ESD1, which is preferably less than bearing surface distance dimension BSD such that at least portion 138B of bearing element 138 remains exposed for use. FIG. 4 illustrates another condition of use in which flex member 104 is at least partially inflated or otherwise extended in a direction away from base surface portion 110. In some cases, such a condition of use can generate and/or apply an associated force capable of selectively positioning or otherwise displacing associated work piece WPC relative to associated support structure SST, such as has been described above. Additionally, or in the alternative, such a condition of use can deploy flex member 104 into a position in which access to bearing element 106 is physically obstructed so that the low-friction, rolling engagement of associated work piece WPC is inhibited and a higher-friction, sliding engagement of associated work piece WPC across at least engagement surface portion 160 can occur. By selectively increasing the friction force acting on one or more areas of the associated work piece, the associated work piece can be re-oriented (e.g., rotated) and/or re-positioned (e.g., translated) as the associated work piece travels along a conveying system. Such a condition of use is shown in FIG. 4 in which engagement surface portion 160 is disposed at a distance from base surface portion 110, as is represented by engagement surface distance dimension ESD2, which is approximately equal to or greater than bearing surface distance dimension BSD such that portion 138B of bearing element 138 remains is physically obscured from engagement by the associated work piece.

Having described examples of pneumatic actuator assemblies in accordance with the subject matter of the present disclosure (e.g., pneumatic actuator assembly 100), it will be appreciated that such pneumatic actuator assemblies are suitable for use in connection with conveying systems in accordance with the subject matter of the present disclosure. One example of such a conveying system is shown and described in connection with FIGS. 5 and 6 as a conveying system 200, such as may be suitable for use in transporting packages and/or other materials and objects. It will be appreciated that any such conveying systems are commonly used in connection with one or more other systems and/or devices. Additionally, it will be appreciated that conveying system 200 can include any number of one or more systems, components and/or devices, and that the conveying system can be operatively associated with any such other systems and/or devices in any suitable manner.

Figure 5:
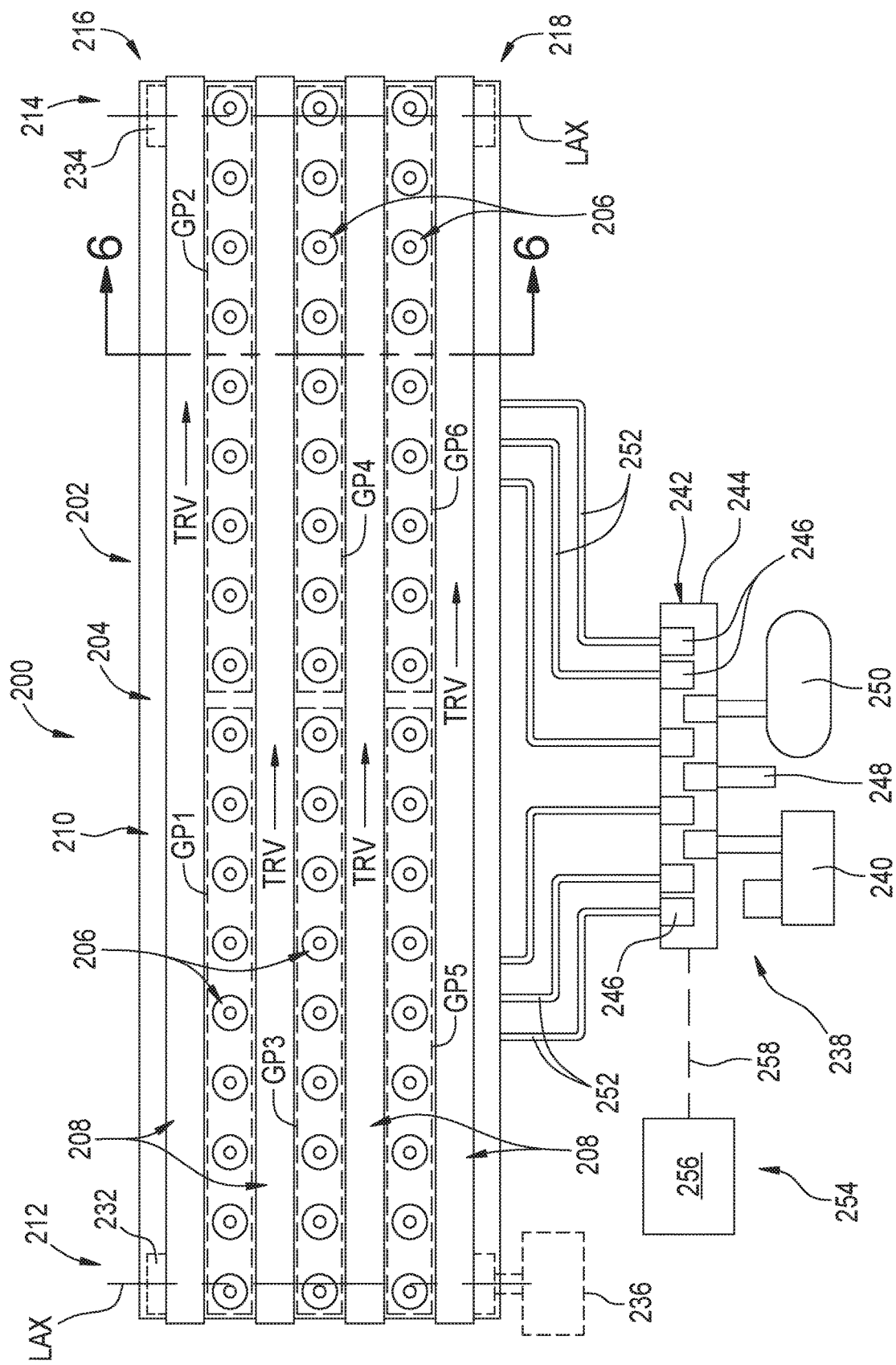
FIG. 5 is a schematic representation of one example of a conveying system that includes one or more pneumatic actuator assemblies in accordance with the subject matter of the present disclosure.
Figure 6:
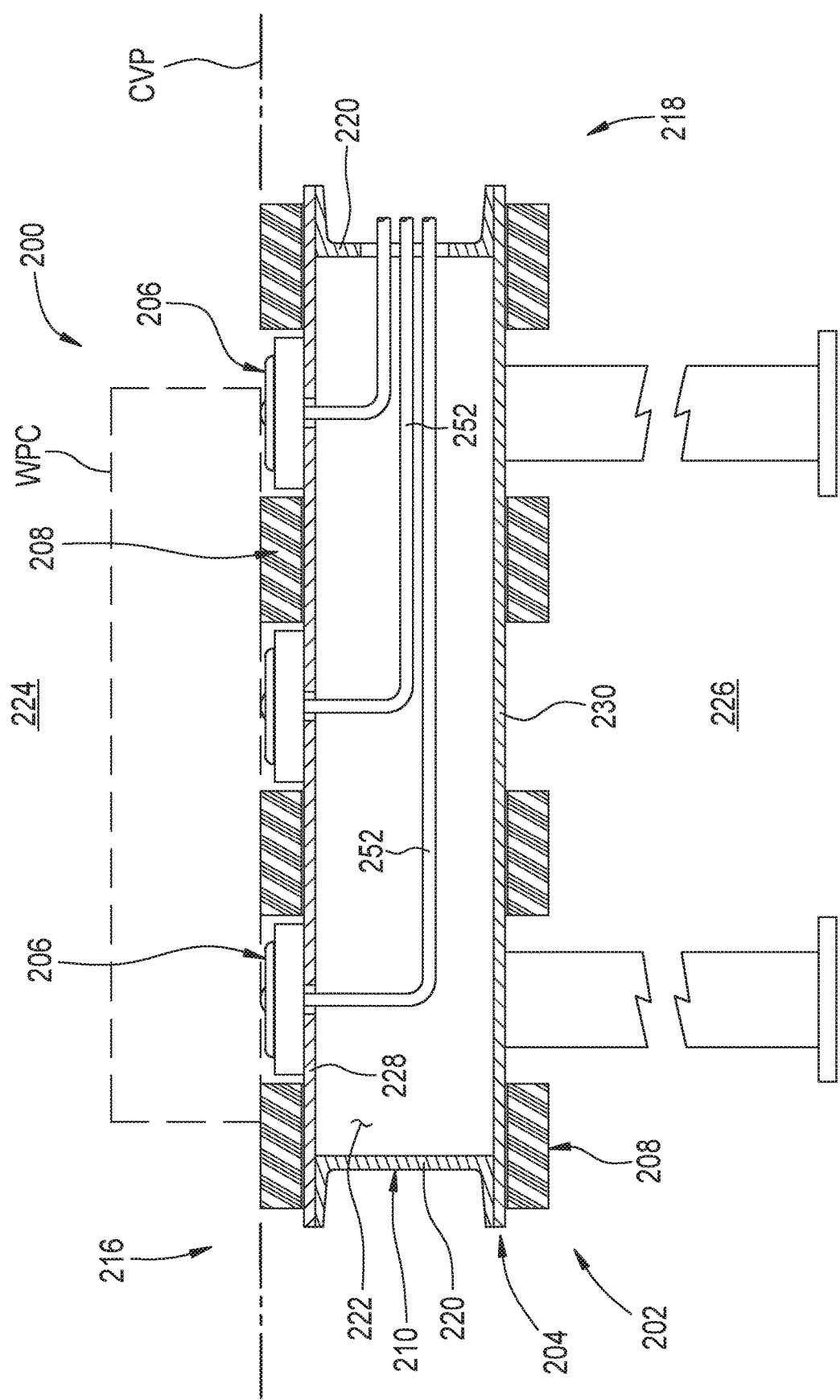
FIG. 6 is a cross-sectional side view of the exemplary conveying system shown in FIG. 5 taken from along line 6-6 therein.

Conveying system 200 can include a conveyor assembly 202 as well as one or more other systems, components and/or devices that are operatively associated with conveyor assembly 202 and/or one another. Conveyor assembly 202 can include a frame assembly (or frame structure) 204 that functions as a stationary structure, and one or more pneumatic actuator assemblies 206 that is/are operatively supported on frame assembly 204. As mentioned above, pneumatic actuator assemblies 206 can be of the type, kind and/or construction shown and described herein in detail as pneumatic actuator assemblies 100 in connection with FIGS. 1-4. Conveyor assembly 202 can also, optionally, include one or more conveyor belts 208 that are operatively supported on or along frame assembly 204 for displacement therealong in an otherwise conventional manner. It will been appreciated that a wide variety of conveyor belt constructions can and have been developed for use in a broad array of applications and environments. It will be appreciated that conveyor system 200, conveyor assembly 202, frame assembly 204 and conveyor belts 208 are schematically illustrated in FIGS. 5 and 6. As such, it is to be recognized and understood that the features thereof are merely exemplary and are intended to be representative of any of such known constructions.

Frame assembly 204 can include a frame 210 that extends longitudinally (i.e., lengthwise) between opposing ends 212 and 214 and laterally (i.e., widthwise) between opposing edges 216 and 218. Frame 208 can include a plurality of rail members 220 that are spaced laterally apart from one another and extend in a generally longitudinal direction. One or more tie members 222 can extend in a generally lateral direction and operatively interconnected with rail members 220 to form a substantially-rigid frame structure. Frame 210 of frame assembly 204 can extend vertically (i.e., heightwise) between opposing sides 224 and 226. A platform or deck member 228 can extend laterally and/or longitudinally across and between at least rail members 220 along side 224, and can be secured on or along at least the rail members to at least partially form a support structure for pneumatic actuator assemblies 206 and/or conveyor belts 208. In some cases, a platform or deck member 230 can extend laterally and/or longitudinally across and between rail members 220 along side 226. Rolls 232 and 234 can be supported on frame 210 along ends 212 and 214, respectively. In a preferred arrangement, one of rolls 232 and 234 is supported on frame 210 for rotational motion about a lateral axis LAX, and is operatively associated with a rotational motion source 236 to function as a drive roll for conveyor assembly 202. In such case, the other of rolls 232 and 234 can be supported on frame 210 for substantially free rotation about a lateral axis LAX and can function as a driven roll of conveyor assembly 202.

Conveyor belts 208 are supported on frame assembly 204 and are operatively engaged with rolls 232 and 234 such that the conveyor belts can be displaced relative to frame 210 as the rolls are rotated about lateral axes LAX. In many cases, conveyor belts 208 can take the form of an endless or otherwise continuous loops of material that extend along side 224 of conveyor assembly 202, around one of rolls 232 and 234, along side 226 of conveyor assembly and back around the other of rolls 232 and 234. For example, conveyor belts 208 can be displaced during use in a direction of travel represented by arrow TRV in FIG. 5. During an exemplary use, conveyor belts 208 can abuttingly engage or otherwise support packages, products, baggage or other materials (e.g., collectively associated work pieces WPC) disposed on conveyor assembly 202. By selectively operating pneumatic actuator assemblies 206, frictional forces from the actuator assemblies can be applied to associated work pieces WPC such that the same can be rotated and/or translated to alter the orientation and/or position of associate work pieces relative to the conveyor assembly. In some cases, a plurality of pneumatic actuator assemblies 206 can be used. In some cases, one or more of the plurality of pneumatic actuator assemblies can be independently operated. Additionally, or in the alternative, two or more of the plurality of pneumatic actuator assemblies can be fluidically connected with one another to form one or more groups of actuator assemblies, such as are represented in FIGS. 5 and 6 by actuator assembly groups GP1-GP6, for example. It will be appreciated that a plurality of pneumatic actuator assemblies 206 can be disposed in fluid communication with one another in any suitable configuration and/or arrangement, such as any combination of parallel and/or series with one another. It will be appreciated that if a plurality of conveyor belts 208 are used, the plurality of conveyor belts can be disposed in any suitable arrangement and/or configuration. For example, the conveyor belts can be disposed in laterally-spaced relation with one another with one or more pneumatic actuator assemblies disposed between adjacent ones of the conveyor belts, such as is shown in FIGS. 5 and 6, for example.

Conveying system 200 can also optionally include a pressurized gas system 238 that is operatively associated with at least pneumatic actuator assemblies 206 for selectively supplying pressurized gas (e.g., air) thereto and selectively transferring pressurized gas therefrom. In the exemplary embodiment shown in FIG. 5, pressurized gas system 238 includes a pressurized gas source, such as a compressor 240, for example, for generating pressurized air or other gases. The pressurized gas system can also include any number of one or more control devices of any suitable type, kind and/or construction that may be capable of permitting and/or preventing the selective transfer of pressurized gas. For example, a valve assembly 242 is shown as being in communication with compressor 240 and can be of any suitable configuration or arrangement. In the exemplary embodiment shown, valve assembly 242 includes a valve block 244 with a plurality of valves 246 supported thereon. Valve assembly 242 can also optionally include a suitable exhaust, such as a muffler 248, for example, for venting pressurized gas from the system. Optionally, pressurized gas system 238 can also include a reservoir 250 in fluid communication with valve assembly 242 and suitable for storing pressurized gas for an extended period of time, such as hours, days, weeks or months, for example.

The one or more control devices, such as valve assembly 242, for example, can be in fluid communication with pneumatic actuator assemblies 206 in any suitable manner, such as through suitable pressurized gas lines 252, for example. As such, pressurized gas can be selectively transferred to and/or from the actuator chamber (e.g., actuator chamber 134) of one or more of pneumatic actuator assemblies 206 through valve assembly 242, such as to selectively actuate or otherwise alter or maintain the actuator height. As mentioned above, pneumatic actuator assemblies 206 can be disposed in fluid communication with pressurized gas system 238 and/or one another in any suitable manner and/or fluid communication arrangement. For example, two or more of pneumatic actuator assemblies 206 (e.g., in the same or different ones of groups GP1-GP6) can be disposed in fluid communication with one another in parallel and/or in series relative to one another.

Conveying system 200 can also include a control system 254 that is capable of communication with any one or more other systems and/or components of conveying system 200 and/or other systems, and is capable of selective operation and control of one or more actuator assemblies 206 and/or pressurized gas system 238. Control system 254 can include a controller or electronic control unit (ECU) 256 in communication with compressor 240 and/or valve assembly 242, such as through a suitable conductor or lead 258, for example, for selective operation and control thereof, including supplying and exhausting pressurized gas to and from the actuator chambers of any number of one or more actuator assemblies 206. Additionally, it will be appreciated that controller 256 can be of any suitable type, kind and/or configuration.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," pneumatic," and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A pneumatic actuator assembly dimensioned for securement to an associated structural component and operable to support an associated object in spaced relation to the associated structural component, said pneumatic actuator assembly comprising:
   a mounting base having a first side and a second side opposite said first side, said mounting base including a mounting base wall with a base surface portion disposed along said first side and a bearing support surface portion disposed along said second side and facing away from said base surface portion;
   a flex member including a flex member wall at least partially formed from a flexible polymeric material, said flex member wall including an engagement wall portion and being operatively secured to said mounting base such that an actuator chamber is at least partially defined therebetween; and,
   a bearing element including a bearing element surface and operatively supported on said mounting base such that a first portion of said bearing element surface is disposed in facing relation to said bearing support surface portion and a second portion of said bearing element surface disposed outwardly of said mounting base a bearing surface distance from said base surface portion;
   said pneumatic actuator operably displaceable between a first operative condition in which said engagement wall portion of said flex member wall is disposed a first engagement distance from said base surface portion that is less than said bearing surface distance such that said second portion of said bearing element surface is exposed to abuttingly engage the associated object, and a second operative condition in which said engagement wall portion is displaced a second engagement distance from said base surface portion that is greater than said bearing surface distance such that said engagement wall portion is disposed beyond said second portion of said bearing element surface to abuttingly engage the associated object.

2. A pneumatic actuator assembly according to claim 1, wherein said flex member includes an opening extending therethrough and said bearing element is accessible through said opening.

3. A pneumatic actuator assembly according to claim 1, wherein said mounting base wall includes first and second attachment surface portion disposed radially outward of said bearing support surface portion.

4. A pneumatic actuator assembly according to claim 3, wherein said flex member wall includes a first attachment wall portion and a second attachment wall portion disposed radially outward of said first attachment wall portion such that said flex member is an endless annular ring.

5. A pneumatic actuator assembly according to claim 4, wherein said first attachment wall portion is secured to said mounting base wall along said first attachment surface portion such that a substantially fluid-tight seal is formed therebetween, and said second attachment wall portion is secured to said mounting base wall along said second attachment surface portion such that a substantially fluid-tight seal is formed therebetween.

6. A pneumatic actuator assembly according to claim 1, wherein said mounting base wall includes a passage extending therethrough in fluid communication with said actuator chamber.

7. A pneumatic actuator assembly according to claim 1, wherein inflation of said actuator chamber transitions said pneumatic actuator assembly from said first operative condition toward said second operative condition and deflation of said actuator chamber transitions said pneumatic actuator from said second operative condition toward said first operative condition.

8. A pneumatic actuator assembly according to claim 1, wherein said bearing support surface portion has at least an approximately hemispherical shape.

9. A pneumatic actuator assembly according to claim 8, wherein said bearing element surface is approximately spherical.

10. A pneumatic actuator assembly according to claim 1, wherein said bearing element includes at least one of a ball bearing element and a roller bearing element.

11. A conveying system comprising:
    a frame structure extending heightwise between a first frame side and a second frame side with a support surface disposed along said first frame side; and,
    a pneumatic actuator assembly disposed along said support surface of said frame structure, said pneumatic actuator assembly including:
      a mounting base including a mounting base wall with a base surface portion disposed along said support surface of said frame structure and a bearing support surface portion facing away from said support surface of said frame structure;
      a flex member including a flex member wall at least partially formed from a flexible polymeric material, said flex member wall including an engagement wall portion and being operatively secured to said mounting base such that an actuator chamber is at least partially defined therebetween; and,
      a bearing element including a bearing element surface, said bearing element supported on said mounting base such that a first portion of said bearing element surface is disposed in facing relation to said bearing support surface portion and a second portion of said bearing element surface disposed outwardly of said mounting base;
      said pneumatic actuator displaceable between a first condition in which said second portion of said bearing element surface is spaced a greater distance from said support surface of said frame structure than said engagement wall portion of said flexible wall and a second condition in which said engagement wall portion is spaced a greater distance from said support surface than said second portion of said bearing element surface.

12. A conveying system according to claim 11, wherein said pneumatic actuator assembly is one of a plurality of pneumatic actuator assemblies disposed along said support surface of said frame structure.

13. A conveying system according to claim 11, wherein said flex member of said pneumatic actuator is formed as an endless annular ring that includes an opening extending therethrough, and said flex member is positioned along said mounting base such that said bearing element is accessible through said opening in said flex member.

14. A conveying system according to claim 11, wherein said mounting base wall of said pneumatic actuator includes first and second attachment surface portion disposed radially outward of said bearing support surface portion, and said flex member wall includes a first attachment wall portion secured to said mounting base wall along said first attachment surface portion such that a substantially fluid-tight seal is formed therebetween and a second attachment wall portion secured to said mounting base wall along said second attachment surface portion such that a substantially fluid-tight seal is formed therebetween.

15. A conveying system according to claim 11, wherein said mounting base wall includes a passage extending therethrough in fluid communication with said actuator chamber, and inflation of said actuator chamber transitions said pneumatic actuator assembly from said first operative condition toward said second operative condition and deflation of said actuator chamber transitions said pneumatic actuator from said second operative condition toward said first operative condition.

16. A conveying system according to claim 11, wherein said frame structure extends lengthwise between a first frame end and a second frame end, and extends widthwise between a first frame edge and a second frame edge, and said conveyor assembly further comprises: a first roll supported along said first end of said frame structure; a second roll supported along said second end of said frame structure; and, a conveyor belt positioned along said frame structure adjacent said pneumatic actuator assembly, said conveyor belt operatively connected in an endless manner between said first and second rolls and displaceable along said support surface of frame structure upon rotation of said first and second rolls.

17. A conveying system according to claim 16 further comprising a pressurized gas system including a pressurized gas source and a control device with at least one of said pressurized gas source and said control device in fluid communication with actuator chamber of said pneumatic actuator.

18. A conveying system according to claim 17 further comprising a control system communicatively coupled with at least one of said pressurized gas source and said control device of said pressurized gas system.

19. A method of assembling a pneumatic actuator, said method comprising:
providing a mounting base having a first side and a second side opposite said first side, said mounting base including a mounting base wall with a base surface portion disposed along said first side and a bearing support surface portion disposed along said second side and facing away from said base surface portion;
providing a flex member that includes a flex member wall at least partially formed from a flexible polymeric material, said flex member wall including an engagement wall portion;
securing said flex member to said mounting base such that an actuator chamber is at least partially defined therebetween; and,
providing a bearing element that includes a bearing element surface; and,
supporting said bearing element on said mounting base such that a first portion of said bearing element surface is disposed in facing relation to said bearing support surface portion and a second portion of said bearing element surface disposed outwardly of said mounting base such that said pneumatic actuator is displaceable between a first condition in which said second portion of said bearing element surface is spaced a greater distance from said base surface portion than said engagement wall portion and a second condition in which said engagement wall portion is spaced a greater distance from said base surface portion than said second portion of said bearing element surface.

20. A method according to claim 19 further comprising: connecting said actuator chamber to a pressurized gas source such that transferring pressurized gas into said actuator chamber transitions said pneumatic actuator assembly from said first operative condition toward said second operative condition and such that transferring pressurized gas out of said actuator chamber transitions said pneumatic actuator from said second operative condition toward said first operative condition.

* * * * *